(12) United States Patent
Yokota et al.

(10) Patent No.: US 7,088,476 B2
(45) Date of Patent: Aug. 8, 2006

(54) IMAGE READING APPARATUS

(75) Inventors: Masahiko Yokota, Abiko (JP); Haruo Ishizuka, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 797 days.

(21) Appl. No.: 10/050,851

(22) Filed: Jan. 18, 2002

(65) Prior Publication Data
US 2002/0097450 A1    Jul. 25, 2002

(30) Foreign Application Priority Data
Jan. 19, 2001    (JP)    ............... 2001-012440

(51) Int. Cl.
*H04N 1/04*    (2006.01)
(52) U.S. Cl. .............. 358/474; 358/505; 358/496; 358/497; 358/475; 358/498; 358/487
(58) Field of Classification Search .............. 358/474, 358/505, 496, 497, 475, 487, 498
See application file for complete search history.

(56) References Cited

U.S. PATENT DOCUMENTS

| 4,623,937 | A | * | 11/1986 | Watanabe | .................. 358/483 |
| 5,194,898 | A | * | 3/1993 | Costrop et al. | ............ 358/497 |
| 5,610,731 | A | | 3/1997 | Itoh | .......................... 358/496 |
| 5,734,483 | A | | 3/1998 | Itoh | .......................... 358/496 |
| 5,847,845 | A | * | 12/1998 | Takahashi et al. | .......... 358/475 |
| 6,091,516 | A | | 7/2000 | Chang et al. | ............... 358/474 |
| 6,285,441 | B1 | | 9/2001 | Takahara | .................... 358/496 |

FOREIGN PATENT DOCUMENTS

| JP | 7-288656 | 10/1995 |
| JP | 7-327109 | 12/1995 |
| JP | 11-68592 | 6/1999 |
| JP | 3-364316 | 1/2003 |

OTHER PUBLICATIONS

European Search Report dated Jul. 2, 2004, issued in connection with corresponding Application No. EP 02 00 1378.

* cited by examiner

*Primary Examiner*—Kimberly Williams
*Assistant Examiner*—Negussie Worku
(74) *Attorney, Agent, or Firm*—Fitzpatrick, Cella, Harper & Scinto

(57) ABSTRACT

An image reading apparatus includes an original carriage for carrying an original; a reading element for reading an original image with relative movement therebetween, the reading element having a configuration elongated in a direction crossing with a direction of the movement; a supporting member for supporting the image reading unit; moving means for driving the supporting member to impart the relative movement; a first positioning portion for determining a position, in the longitudinal direction, of the reading element relative to the supporting member; and a second positioning portion for determining a position of the reading element in the moving direction, the second positioning portion supporting the reading element while permitting movement thereof in the longitudinal direction relative to the supporting member.

8 Claims, 10 Drawing Sheets

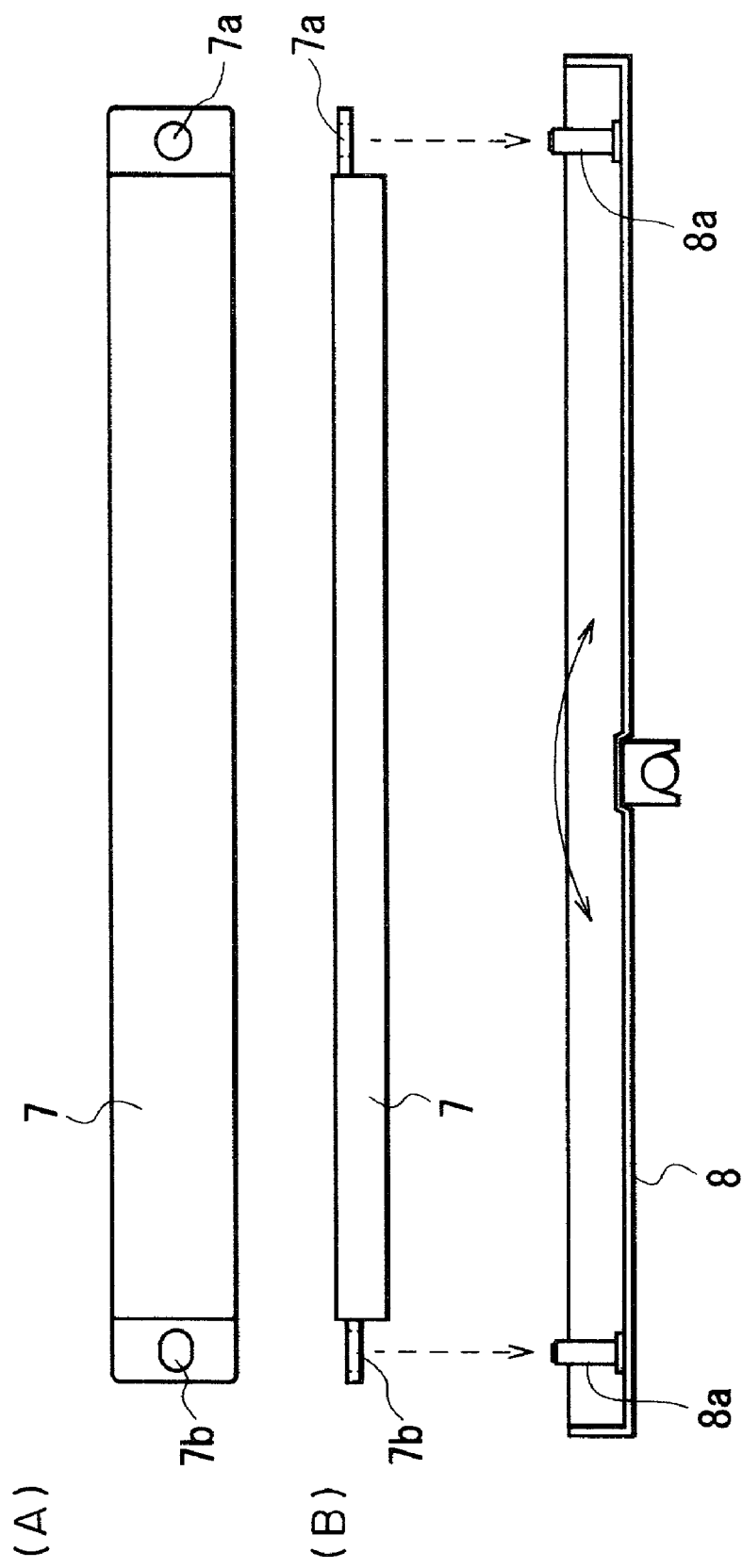

IMAGE READING APPARATUS

FIELD OF THE INVENTION AND RELATED ART

The present invention relates to an image reading apparatus employed in a copying machine, a facsimileing machine, a printer, or the like apparatus.

It has been known that some of plain copying machines, copying machines having the copying function as well as facsimileing function, image scanners equipped with an automatic document feeder (ADF), and the like, are equipped with an image reading apparatus. As for an image reading apparatus employed by such an image forming apparatus as those described above, an image reading apparatus that is capable of scanning an original in two different methods has been proposed: method in which an original is stationarily placed on an original placement glass platen and is scanned by moving an optical reading system, and method in which an original is moved by an automatic document feeder (ADF) or the like and the moving original is scanned by a stationarily placed optical reading system.

Referring to FIG. 10, such an image reading apparatus is provided with a contact type image sensor 1 (CIS), that is, an image reading means, which is disposed under the glass 2 of the image reading portion. In operation, an original D1 is stationarily placed on the glass 2, and is read by moving the CIS1 in the secondary scanning direction, or an original D2 is slid on the second glass 2a so that as the original D2 is slid, it is read by the stationarily placed CIS1.

At this time, a conventional contact type image sensor will be described regarding its structure. Referring to FIG. 11(A), a contact type image sensor comprises an LED 3 as a light source, and a light guiding member 4 for guiding light from the LED 3 to an original. The LED 3 is fixed to one of the lengthwise ends of the light guiding member 4 (in the case of the example in FIG. 11, one LED is attached to the front end). The light emitted from the LED 3 advances through the light guiding member while repeatedly reflected by the interface between the light guiding member 4 and the ambience, and is projected from across the entire lengthwise range of the light guiding member 11.

Referring to FIG. 11(B), the light projected from the light guiding member 4 illuminates the stationary original on the glass 2, being reflected thereby. The reflected light is focused upon a primary photodetector array 6, for example, a CCD or the like, through a Cellfoc lens array 5. These structural members of the image sensor are disposed within a frame 7.

Another example of a conventional contact type image sensor has been known to comprise a pair of LED arrays, as a light source, which are made up of a plurality of aligned LEDs. The pair of LED arrays are disposed in a manner to sandwich the Cellfoc lens array.

The above described prior arts, however, suffer from the following problems.

Referring to FIGS. 12(A) and 12(B), the frame 7 which contains the structural members of the image sensor is provided with a round positioning hole 7a and an elongated positioning hole 7b. The CIS1 is properly positioned relative to a supporting member 8 (carriage) by fitting the pair of bosses 8a of the carriage 8 in these round and elongated positioning holes 7a and 7b.

For cost and weight reduction, the carriage 8 is formed of resinous material. Therefore, there is a possibility that the lengthwise end portions of the carriage 8 will sag as indicated with an arrow mark in FIG. 12(B), that is, the vertical direction perpendicular to the primary scanning direction.

If the lengthwise end portions of the carriage 8 sag, the bosses 8a tilt relative to the horizontal direction; the axial line of each boss 8a tilts relative to the horizontal direction.

If an attempt is made to attach the frame 7 to the carriage 8 when the carriage 8 is in the state described above, the round and elongated holes 7a and 7b fail to align with the pair of bosses 8a of the carriage 8. Forcing the bosses 8a into the holes 7a or 7b possibly results in the damages to the bosses 8a.

There is also a possibility that even after the bosses 8a of the carriage 8 are fitted into the round and elongated holes 7a or 7b, without forcing, the lengthwise end portions of the carriage 8 formed of resinous material will sag due to the warping of the carriage 8 caused by the temperature fluctuation (which occurs because the frame 7 contains a light source). It the lengthwise end portions of the carriage 8 sag due to the warping of the carriage 8, it is possible that the bosses 8a will be pressed against the wall of the round hole 7a or elongated hole 7b, being damaged by the reactive force applied thereto by the wall of the round hole 7a or elongated holes 7b, since the configuration and positioning of the round and elongated holes 7a and 7b afford the bosses 8a virtually no latitude in terms of their movements.

Further, it is possible that as the lengthwise end portions of the carriage 8 sag due to the warping of the carriage 8, the positional relationship between the round positioning hole 7a and corresponding boss 8a changes, which results in the change in the moving range of the CIS1. The change in the moving range of the CIS1 results in the reduction in the geometrical accuracy with which an image is formed. In other words, there is a possibility that the level of geometrical accuracy at which an image is formed will be lowered by the warping of the carriage 8.

SUMMARY OF THE INVENTION

The present invention was made to solve the above described problems of the prior arts. Thus, the primary object of the present invention is to minimize the effects of the deformation of a reading member and the supporting member thereof, which occur they thermally expand, so that it becomes to possible to provide an image reading apparatus, the accuracy of which is not adversely affected by temperature.

These and other objects, features, and advantages of the present invention will become more apparent upon consideration of the following description of the preferred embodiments of the present invention, taken in conjunction with the accompanying drawings.

BRIEF DESCRIPTION OF THE DRAWINGS

FIG. 7(A) is a plan view as seen from above, and FIG. 7(B) is a schematic drawing for showing how the frame and carriage are joined.

FIG. 12 is a schematic drawing for showing the structure of another typical conventional image sensor unit.

DETAILED DESCRIPTION OF THE PREFERRED EMBODIMENTS

Hereinafter, the preferred embodiments of the present invention will be described in detail with reference to the appended drawings.

Embodiment 1

Figure 1:
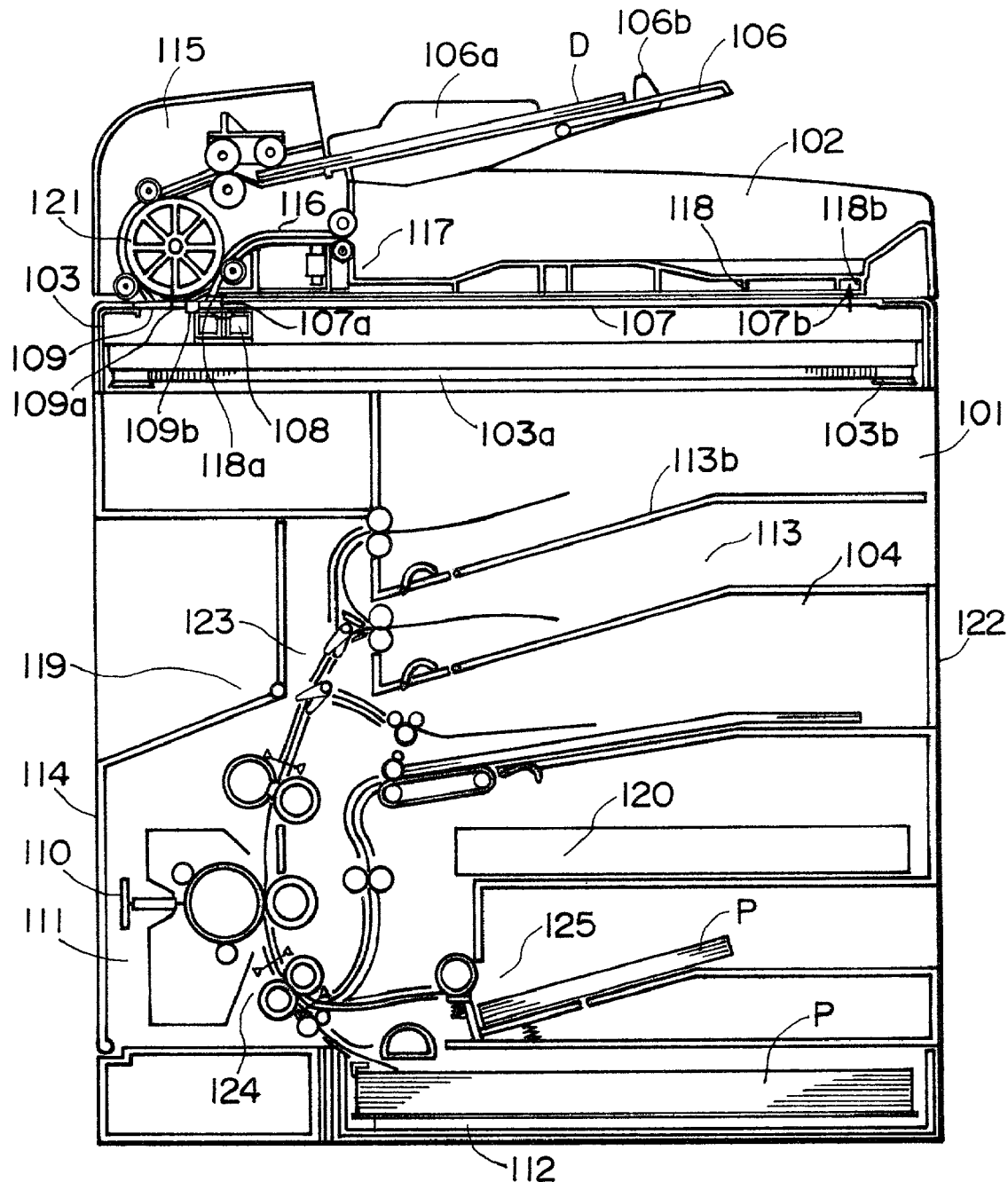
FIG. 1 is a phantom view of the image forming apparatus in the first embodiment of the present invention, as seen from the front side of the apparatus.
Figure 2:
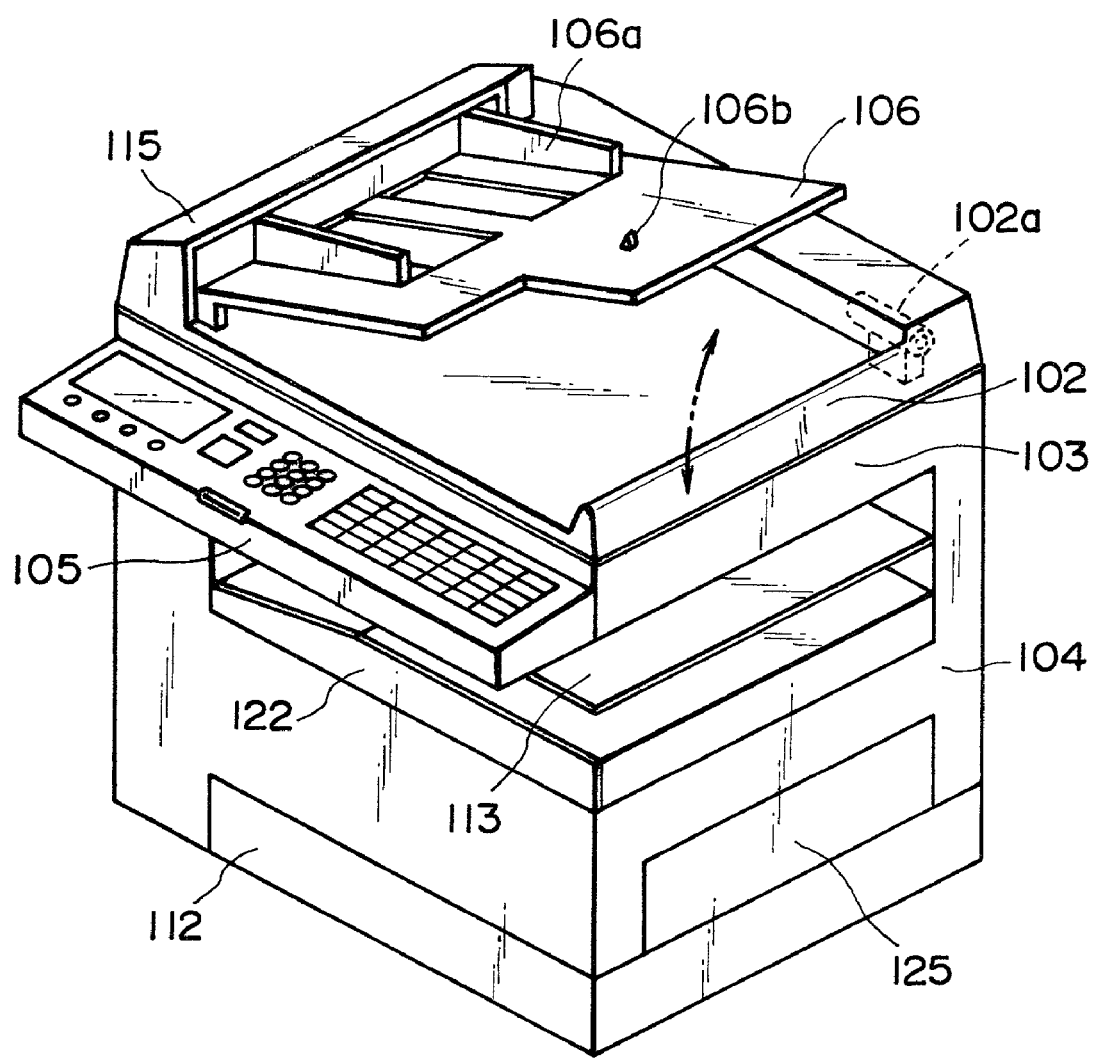
FIG. 2 is a perspective view of the image forming apparatus in the first embodiment of the present invention.
Figure 3:
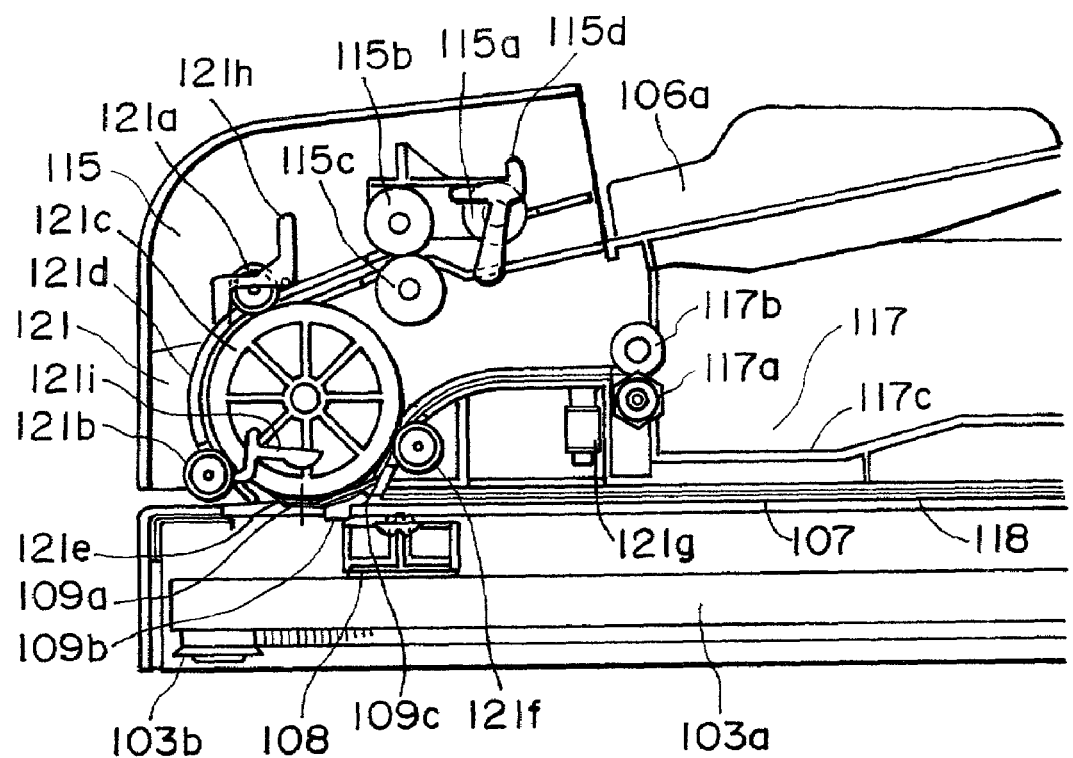
FIG. 3 is an enlarged phantom view of the image reading portion of the image forming apparatus in the first embodiment of the present invention.
Figure 4:
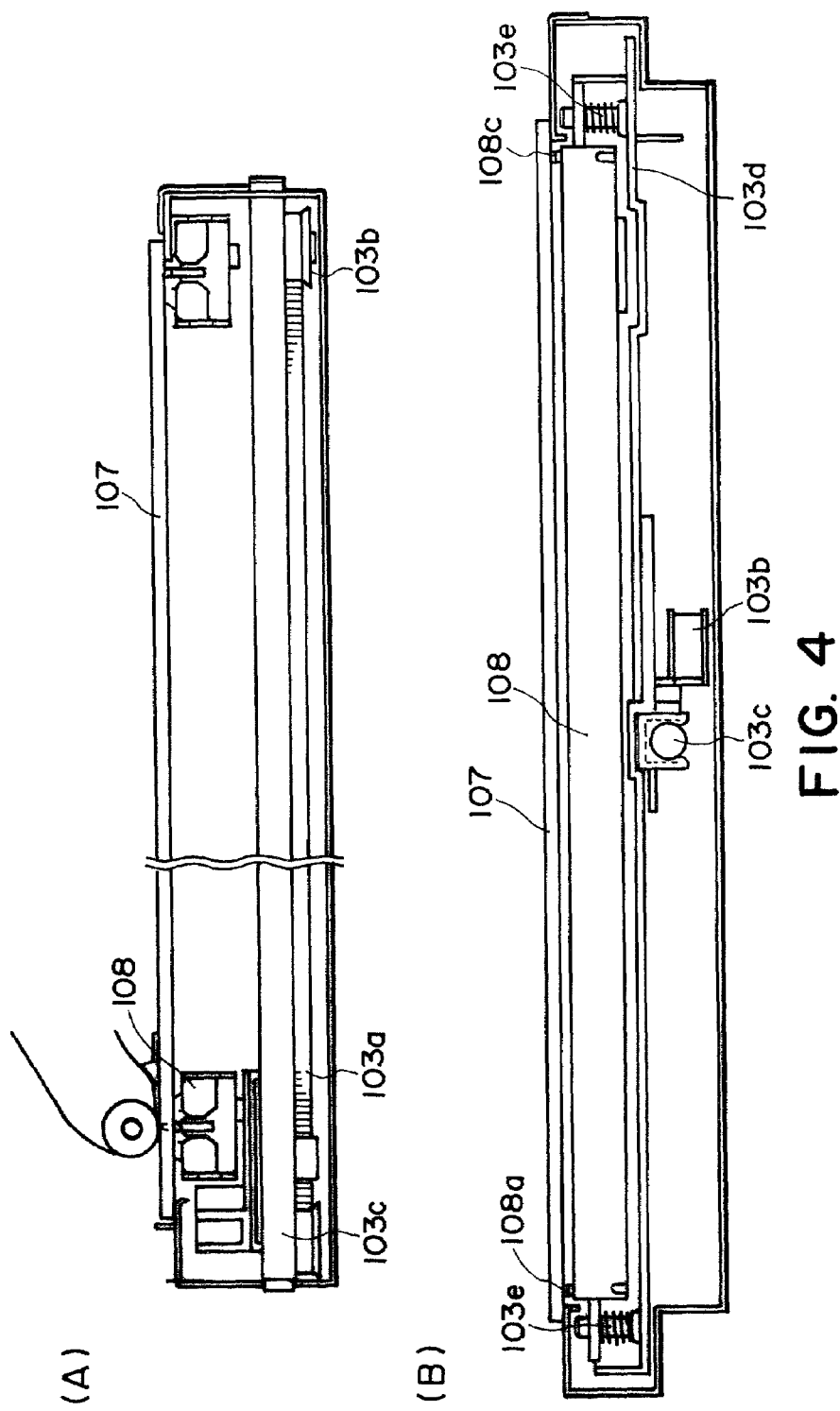
FIGS. 4(A) and 4(B) are drawings showing the internal structure of the image reading portion of the image forming apparatus in the first embodiment of the present invention.

Referring to FIGS. 1–8, the image forming apparatus in the first embodiment of the present invention will be described. In this embodiment, the present invention was applied to a copying machine, or an example of an image forming apparatus. FIG. 1 is a phantom view of the copying machine in accordance with the present invention, as seen from the front side of the machine, and FIG. 2 is a perspective view of the copying machine in accordance with the present invention. FIG. 3 is an enlarged phantom view of the image reading portion of the copying machine.

First, the general structure of the copying machine will be described.

Referring to FIGS. 1, 2, and 3, a referential code 101 designates the main assembly of the copying machine, and a referential code 102 designates the holding/pressing plate of an ADF (automatic document feeder). The ADF separates one by one the plurality of originals D in the form of a sheet stored in layers therein, and conveys each sheet of original D. A referential code 103 designates an image reading portion, as an image reading apparatus, which reads the surface of the original in the form of a sheet, or the surface of a given page of the original in the form of a book, on the original placement glass platen of the image reading portion, and a referential code 104 designates the main assembly of a recording apparatus which employs an electrophotographic printing method which employs an LED array. A referential code 105 designates a control panel comprising a display, a set of input keys, and the like. A referential code 106 designates an original feeding tray, and a referential code 107 designates an original placement glass platen. A referential code 108 designates a reading member, which is a contact type image sensor unit, that is, a scanning unit, and a referential code 109 designates an original placement glass platen used to read the original by moving the original, that is, without moving the image reading portion.

Designated by a referential code 110 is an LED head unit, and designated by a referential code 111 is an image forming portion. Designated by a referential code 112 is a sheet feeding cassette. Designated by a referential code 113 is a sheet delivery portion, which is in the top portion of the recording apparatus main assembly 104, and into which a plurality of the sheets p of recording medium can be discharged in a manner to be placed in layers. A referential code 114 designates a cartridge cover. A referential code 115 designates the sheet separating portion of an ADF. A referential code 116 designates an original discharge path. A referential code 117 designates an original recovery tray. A referential code 118 designates a plate for holding down a plurality of bound originals in order to read one of them. A referential code 119 designates the joint between the image reading portion 103 and recording apparatus main assembly 104, and a referential code 120 designates the control portion of the copying machine, and a referential code 121 is an original conveyance path. A referential code 122 designates a cover for exposing the path through which a recording medium is conveyed in order to form an image on both surfaces of the recording medium, and a referential code 123 is a recording medium conveyance direction switching portion. A referential code 124 designates a recording medium registering portion, and a referential code 125 designates a sheet feeding portion, which is disposed within the recording apparatus main assembly 104 and is capable of handling a plurality of recording medium sheets different in size.

First, a method for reading a certain page of an original in the form of a book will be described.

The holding/pressing plate 102 of the ADF is rotationally attached to the image reading portion 103 by a pair of its hinge portions 102a, which are located on the left and right sides, one for one, of the rear end of the apparatus (left side is unshown). The holding/pressing plate 102 can be rotated away from the image forming apparatus main assembly 104, or rotated back onto the image forming apparatus main assembly 104, by grasping the front side of the holding/pressing plate 102 (direction indicated by a double-headed arrow mark in FIG. 2). The hinge portion 102a is provided with a combination of a damper, a cam, a spring, and the like, so that the holding/pressing plate 102 of the ADF can be held at a predetermined angle (for example, 70 deg.) to allow an original to be set on the original placement glass platen 107.

The image sensor unit 108 is a unit for reading an original to obtain the data for forming an image identical to the original. More specifically, the light from the LED as a light source is guided by a light guiding member formed of resinous material or the like, and is projected onto the surface of the original from which image formation data is obtained. Then, the light reflected by the original is focused by a Cellfoc lens (commercial name) as a focusing means onto a primary sensor element array as a photoelectric transducing means; in other words, the image forming data are obtained from the original.

Referring to FIGS. 4(A) and 4(B), the image sensor unit 108 is movable in the left and right directions of the apparatus, following the guiding shaft 103c. It can be moved to any point within its movable range by a combination of a driving pulley 103b and an unshown motor. The image sensor unit 108 is supported by the guiding shaft 103c, with the interposition of a boxy carriage 103a, being kept under the upward pressure generated by a spring 103e. Disposed between the image sensor unit 108 and original placement glass plate 107 are a pair of spacers 108a. The image sensor unit 108 is structured so that in order for the image sensor unit 108 to read the image of an original placed on the predetermined range, that is, the range from the reading starting position 107a to the reading ending position 107b, of the original placement glass platen 107, the image sensor 108 is movable at a constant speed across the above described predetermined range.

A jump step 109b (sheet deflecting step) protrudes upward above the original placement glass platen 107, and its bottom surface is covered with a white sheet 109c so that when the image sensor unit 108 is below the jump step 109b, the image sensor unit 108 is rectified in terms of shading. When reading an original by moving the image sensor unit 108, each time an original is scanned by the image sensor unit 108, the image sensor unit 108 is rectified in terms of shading as it is moved below the jump step 109b, past the jump step 109b. This setup is effective to reduce the effects of the fluctuation of the output of the light source of the image sensor unit 108, which occurs with the elapse of time.

The original pressing plate 118 is formed of laminar material comprising white sheet, sponge plate, and the like. It prevents an original on the original placement glass platen 107 from lifting or floating in the air. The left and right edges 118a and 118b of the original pressing plate 118 correspond to the reading starting position 107a and reading ending position 107b, of the reading range of the image sensor unit 108 when reading the original by moving the image sensor unit 108.

Next, the method for reading an original by moving the original will be described.

The sheet separating portion 115 of the ADF comprises: a pickup roller 115a vertically movable by an unshown actuator; a separation roller 115b; a retardation roller 115a which is placed in contact with the separation roller 115b, and is rotated in the opposite direction with respect to the rotational direction of the separation roller 115b; and the like.

First, the original D in the form of a sheet is placed in the original feeding tray 106 so that the image to be copied faces upward. Then, the pickup roller 115a is pressed downward so that the original D is pushed out of the original feeding tray 106 and is fed between the separation roller 115b and retardation roller 115c. If two or more originals are pushed out of the original feeding tray 106 at the same time, they are separated one by one by the separation roller 115b kept pressed upon the retardation roller 115c. Then, each original is conveyed, by a reading/conveying roller 121c upon which separating/conveying rollers 121a and 121b are kept pressed by unshown springs, through a U-turn path, being guided by an original guide 121d.

Then, the original D is conveyed onto the glass platen 109 for reading an original by moving the original, and is conveyed further, being kept flatly pressed upon the glass platen 109 by the original pressing plate 121e kept under the pressure from an unshown spring. When reading an original by moving the original, the image sensor unit 108 is held at the reading point 109a of the glass platen 109, and as the original D is moved past the reading point 109a, the image formation data of the image bearing surface of the original D is read by the image sensor unit 108.

As the original D is conveyed past the reading point 109a, it is deflected toward the original holding/pressing plate 102 of the ADF by the jump step 109b, and then, is conveyed further by the reading/conveying roller 121c upon which the reading/conveying roller 121f is kept pressed by a spring.

Then, the original D is discharged into an original recovery tray 117c by a discharge roller 117b kept pressed against the discharge roller 117a by a spring. On the upstream side of the discharge roller 117b, a reading completion stamp 121g is disposed to make it possible to stamp a reading completion mark on the original D.

The original feeding tray 106 is attached to the original holding/pressing plate 102 of the ADF, being rendered immovable relative to the original holding/pressing plate 102. The original feeding tray 106 is fitted with a slider 106a, which is slidable in the direction (widthwise direction of original D) perpendicular to the direction in which original D is conveyed. A plurality of the originals D in the form of a sheet, placed in layers in the original feeding tray 106, can be vertically aligned by this slider 106a, at their lengthwise edges. The original feeding tray 106 is also provided with an original length sensor 106b, which is on the upwardly facing surface of the actual tray portion of the original feeding tray 106 so that the length of the original D placed in the tray portion can be detected. Further, the sheet separating portion 115 of the ADF is provided with a plurality of original width sensors 115d, which are distributed in the widthwise direction of the original D, so that the width, as well as presence or absence, of the original D can be detected. The size and orientation of the original D can be detected by the combined outputs of the original width sensors 115d and original length sensor 106b.

The original conveyance path 121 is provided with an original conveyance sensor 121h and an original edge sensor 121i. The original conveyance sensor 121h detects whether or not the original D has been released from the separating portion 115 of the ADF, and whether or not the trailing edge of the original D has passed. The original edge sensor 121i detects the passages of the leading and trailing edges of the original D, and its outputs are used to control the reading timing.

As described above, the structure of the image sensor unit 108 in accordance with the present invention is such that in order to read the image of an original, light is projected onto the original so that the light reflected by the original is focused upon a sensor through an focusing optical system.

Figure 5:
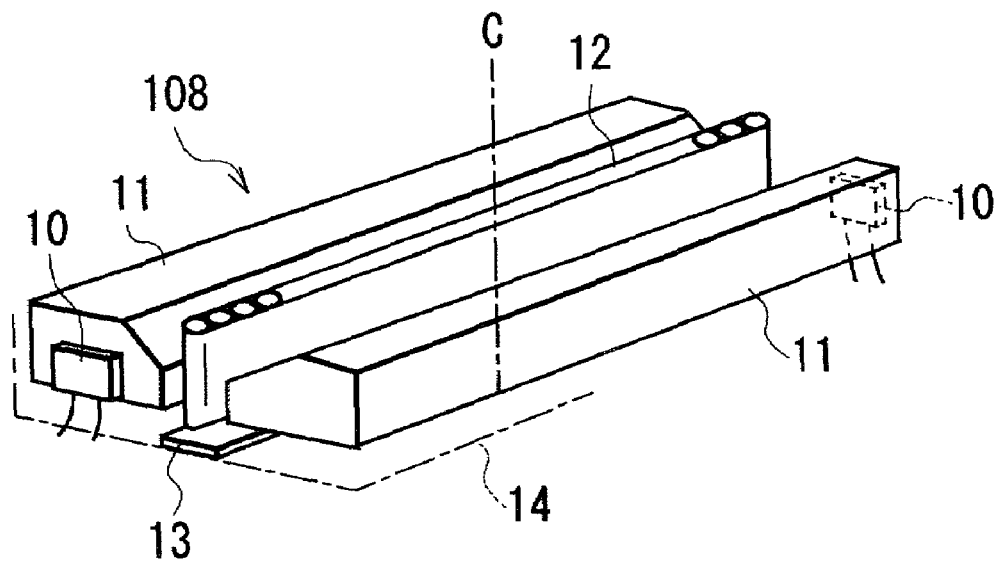
FIG. 5 is a perspective view of the image sensor unit in the first embodiment of the present invention, and shows the structure thereof.

FIG. 5 shows the concrete structure of the image sensor unit 108 in this embodiment. The image sensor unit 108 comprises: a pair of LEDs 10, that is, light emitting elements as a light source; a pair of light guiding members 11 for guiding the light emitted by the LEDs 10, to an original; a Cellfoc lens array 12 as a focusing optical system; and a sensor 13 as a light receiving element. The pair of the light guiding member 11 are disposed in a manner to sandwich the Cellfoc lens array 12. The sensor 13 is located directly below the Cellfoc lens array 12. The structural members of the image sensor are disposed, as light source unit components, within a frame 14 (boxy shell).

The LED 10 is fixed to one of the lengthwise ends of each light guiding member 11. In the case of the image sensor unit 108 shown in the drawing, two LEDs 10 are fixed to the pair of the light guiding members 11; one LED 10 is fixed to one of the lengthwise ends of one of the light guiding members 11, and the other LED 10 is fixed to the opposite lengthwise end of the other light guiding member 11. In other words, the two light guiding members 11 and two LEDs 10 are symmetrical disposed with respect to an axial line C in the drawing.

Figure 6:
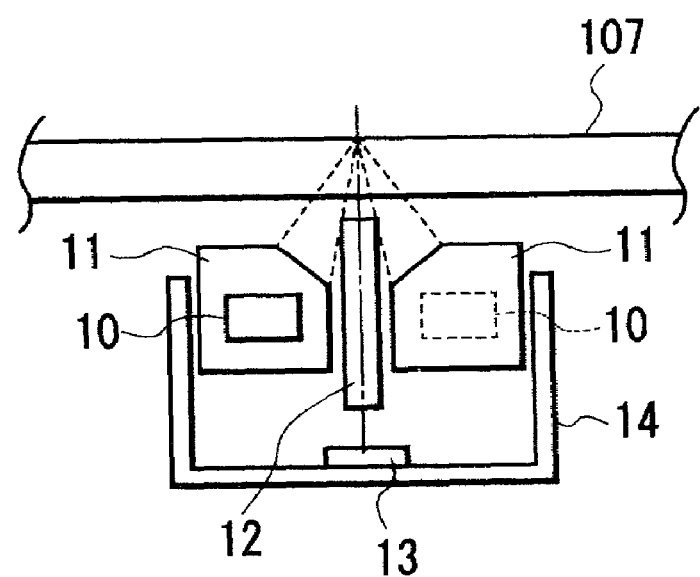
FIG. 6 is a sectional view of the image sensor unit in the first embodiment of the present invention, and shows the structure thereof.
Figure 7:
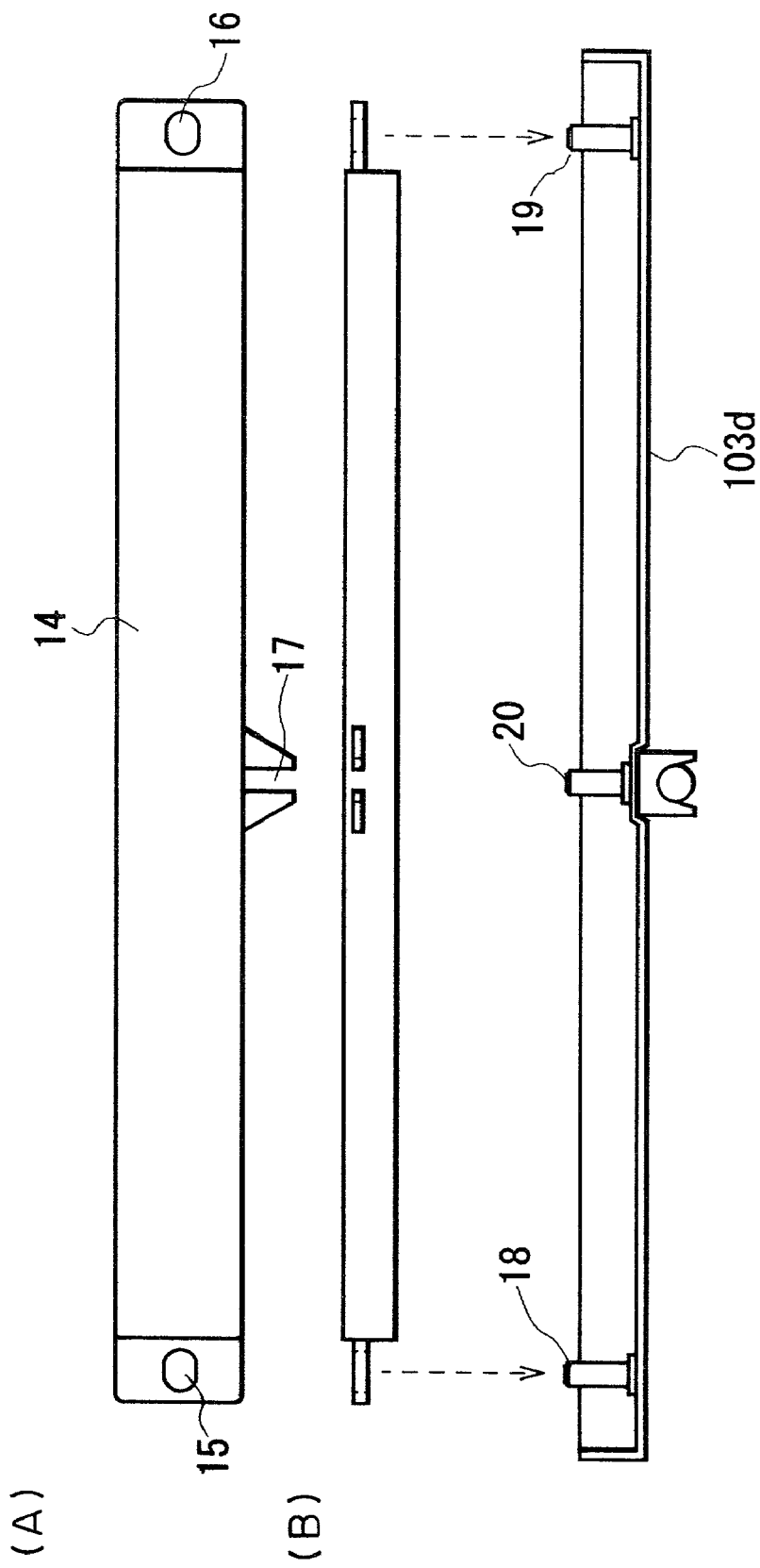
FIG. 7 is a drawing showing the structural elements of the image sensor unit in the first embodiment of the present invention.

The light emitted from each LED 10 advances through the light guiding member 11, and is projected from across the entire length of the light guiding member 11 while being repeatedly reflected by the interface between the light guiding member 11 and the ambience. Referring to FIG. 6, the light projected from the light guiding member 11 illuminates the original in the form of a book on the original placement glass platen 107, being reflected thereby. The reflected light is focused upon the sensor 13, through Cellfoc lens array 12.

Figure 8:
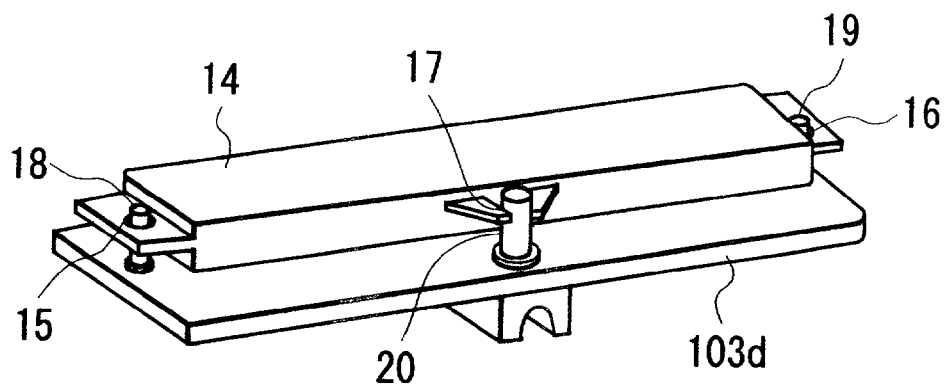
FIG. 8 is a schematic perspective drawing of the image sensor unit in the first embodiment of the present invention, for showing the structural members thereof, and the state of the image sensor unit after the joining of the frame and carriage.

At this time, the characteristic features of the structure of the image reading apparatus in accordance with the present invention will be described. FIG. 7(A) is a schematic plan view of the frame 14 as seen from above, and FIG. 7(B) is a schematic drawing for showing how the frame 14 of the reading member and the supporting member 103d (carriage) are joined. FIG. 8 is a schematic drawing for showing the frame 14 and carriage 103d after the joining of the frame and carriage.

The frame 14 in which the structural members of the image sensor unit 108 is provided with a pair of elongated holes 15 and 16, which are located in the lengthwise end portions of the frame 14. The holes 15 and 16 are the portions for properly positioning the frame 14 relative to the carriage 103d in terms of the secondary scanning direction. The frame 14 is also provided with a positioning portion 17 for properly positioning the frame 14 relative to the carriage 103d in terms of the primary scanning direction. The positioning portion 17 is located approximately between the elongated holes 15 and 16.

The carriage 103d is provided with a pair of bosses 18 and 19, which are located on the lengthwise end portions of the carriage 103d. The carriage 103d is also provided with a boss 20, which is located approximately at the center of the carriage 103d. The configurations of the elongated holes 15 and 16 and positioning portion 17 are such that after the engagement of the bosses 18, 19, and 20 with the corresponding elongated holes 15 and 16, and the positioning portion 17, the frame 14 is prevented, by the bosses 18 and 19, from moving in the secondary scanning direction (short axis direction), while being afforded some degree of latitude in terms of the movement in the primary scanning direction (lengthwise direction), and is prevented, by the boss 20, from moving in the primary scanning direction (lengthwise direction), while being afforded some degree of latitude in terms of the movement in the secondary scanning direction (short axis direction). In other words, the frame 14 is held to the carriage 103d, being allowed to move (frame 14 is kept under the upward pressure from a spring 103e) only vertically, being guided by the bosses 18, 19, and 20.

With the provision of the above described structural arrangement, even if the carriage 103d, which is formed of resinous material for weight and cost reduction, sags at the lengthwise ends, and the sagging causes the bosses 18 and 19 located on the lengthwise (primary scanning direction) ends of the carriage 103d to tilt in the lengthwise direction of the carriage 103d, the elongated holes 15 and 16, in which the bosses 18 and 19 fit one for one, afford the bosses 18 and 19 a certain degree of latitude in terms of their movement in the lengthwise direction of the carriage 103d; in other words, the elongated holes 15 and 16 allow the bosses 18 and 19 to tilt a certain angle in the lengthwise direction of the carriage 103d. Therefore, the bosses 18 and 19 are not damaged by the sagging of the lengthwise end portions of the carriage 103d which occurs due to the warping of the carriage 103d.

Further, the positioning portion 17 for positioning the frame 14 relative to the carriage 103d in terms of the primary scanning direction is prevented from moving in the primary scanning direction (lengthwise direction), by the boss 20 located approximately at the center of the carriage 103d in terms of the lengthwise direction. Therefore, the amount by which the frame 14, or the image sensor unit 108, is displaced in terms of the primary scanning direction (lengthwise direction) by the sagging of the lengthwise end portions of the carriage 103d caused by the warping of the carriage 103d, can be minimized to improve the level of geometric accuracy at which an image is formed. In other words, the present invention makes it possible to prevent the vertical warping of the carriage 103d from reducing the level of quality at which an image is formed.

Further, the frame 14 is prevented, by the elongated holes 15 and 16 and the bosses 18 and 19, from moving in the secondary scanning direction, while being afforded some degree of latitude in terms of the movement in the primary scanning direction (lengthwise direction), and is prevented, by the positioning portion 17 and the boss 20, from moving in the primary scanning direction (lengthwise direction), while being afforded some degree of latitude in terms of the movement in the secondary scanning direction. Also, the frame 14 is kept pressed upward upon the glass surface by the spring 103e. Therefore, even if the carriage 103d warps in the vertical direction, the frame 14, or the image sensor unit 108 is not displaced in the primary (lengthwise) or secondary scanning direction. Therefore, the level of quality at which an image is formed does not reduce. In other words, the present invention can improve the level of geometric accuracy at which an image is formed.

Embodiment 2

Figure 9:
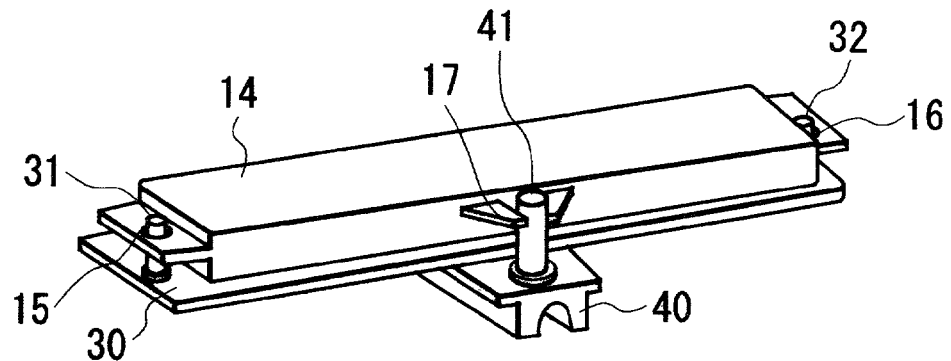
FIG. 9 is a schematic perspective drawing of the image sensor unit in the second embodiment of the present invention, for showing the structural members thereof, and the state of the image sensor unit after the joining of the frame and carriage.
Figure 10:
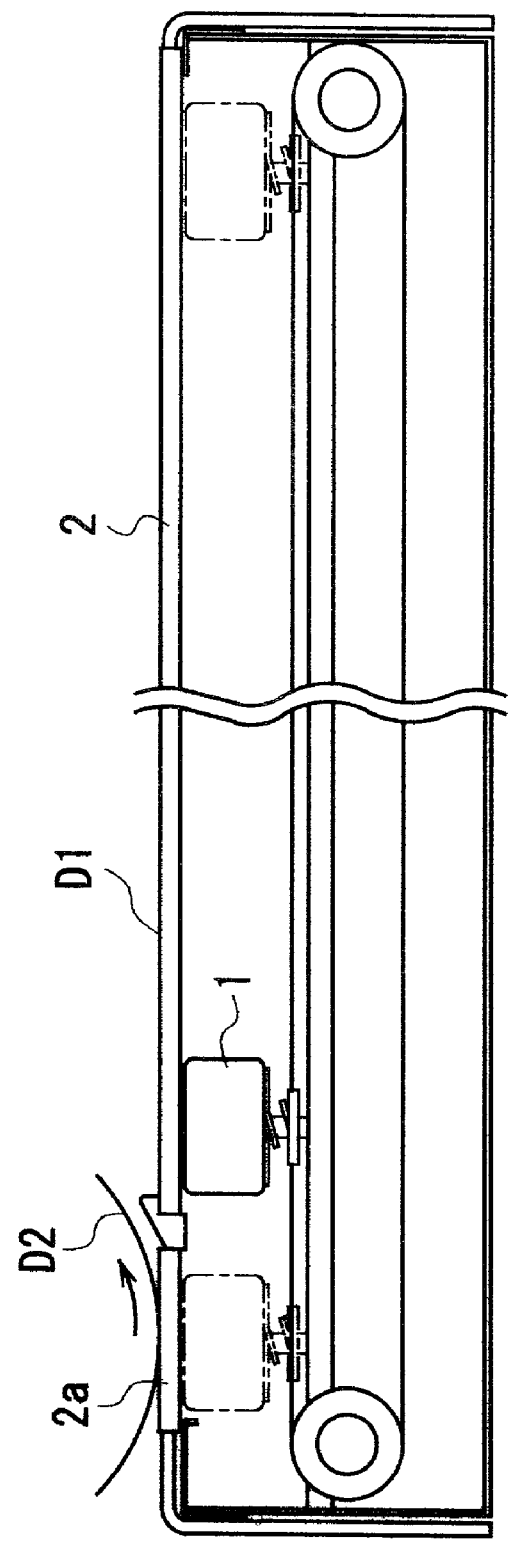
FIG. 10 is a schematic drawing of a typical conventional image reading apparatus for an image forming apparatus, for showing the internal structure thereof.
Figure 11:
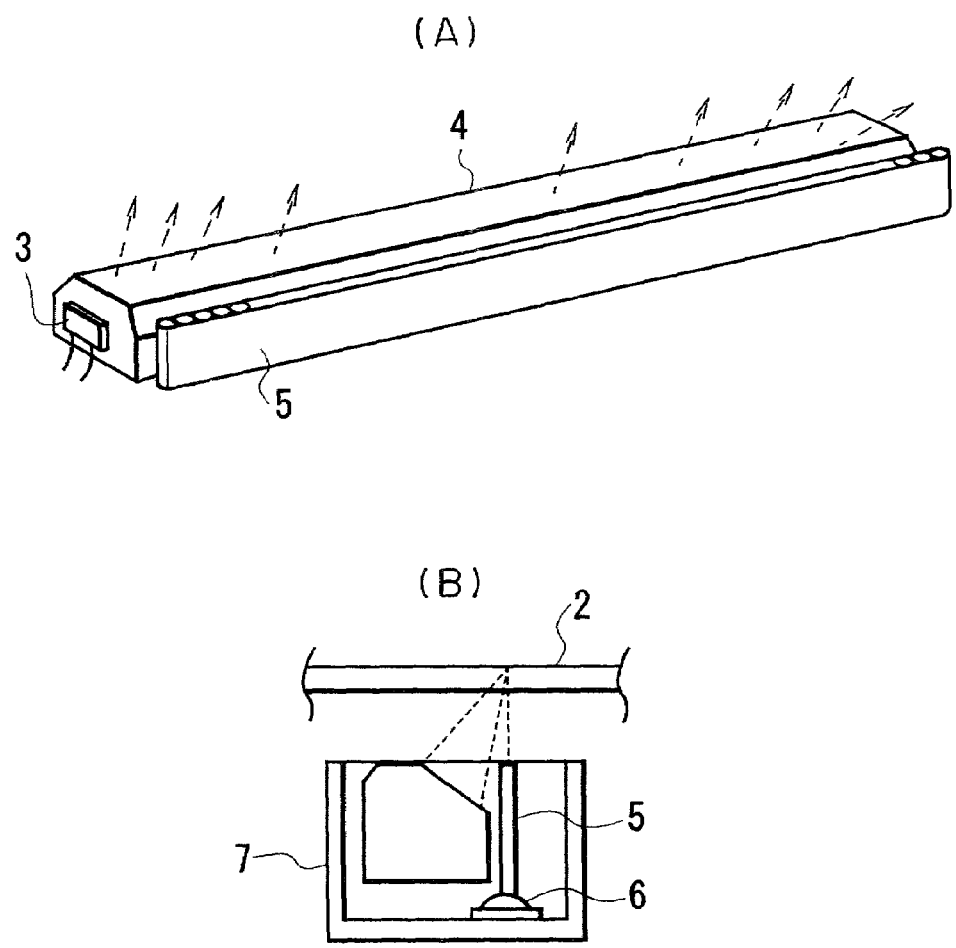
FIGS. 11(A) and 11(B) are schematic drawings showing the structure of a typical conventional image sensor unit.

FIG. 9 shows the second embodiment of the present invention. In the drawing, the structural members similar to those in the first embodiment are given the same referential codes as those in the first embodiment, and their descriptions will not be given here.

In the above described first embodiment of the present invention, the boss 20 for preventing, in cooperation with the positioning portion 17, the frame 14 from moving in the primary scanning direction (lengthwise direction), while affording some latitude in terms of the movement in the secondary scanning direction, was located approximately at the center of the carriage 103d in terms of the lengthwise direction. In comparison, in this second embodiment, a bearing member 40 which allows the carriage 30 to smoothly move following the guiding shaft 103c is provided with a boss 41, which prevents, in cooperation with the positioning portion 17, the frame 14 from moving in the primary scanning direction (lengthwise direction) while affording some latitude in terms of the movement in the secondary direction.

To describe the characteristic features of the structure of the image sensor unit in this embodiment, the frame 14 which contains the structural members of the image sensor is provided with two elongated holes 15 and 16 as portions for fixing the position of the frame 14 relative to the carriage 30 in terms of the secondary scanning direction, and a positioning portion 17 for fixing the position of the frame 14 relative to the carriage 30 in terms of the primary scanning direction. The elongated holes 15 and 16 are located at the lengthwise end portions of the frame 14, one for one, and the positioning portion 17 is located between the elongated holes 15 and 16 in terms of the lengthwise direction of the frame 14.

The carriage 30 is provided with a pair of bosses 31 and 32, which are located on the lengthwise end portions of the carriage 30. The bearing member 40 is provided with a boss 41, which is located approximately at the center of the carriage 30 in terms of the lengthwise direction. The configurations of the elongated holes 15 and 16 and positioning portion 17 are such that after the engagement of the bosses 31, 32, and 41 with the corresponding elongated holes 15 and 16, and the positioning portion 17, the frame 14 is prevented, by the bosses 31 and 32, from moving in the secondary scanning direction (short axis direction), while being afforded some degree of latitude in terms of the movement in the primary scanning direction (lengthwise direction), and is prevented, by the boss 41, from moving in the primary scanning direction (lengthwise direction), while being afforded some degree of latitude in terms of the movement in the secondary scanning direction (short axis direction). In other words, the frame 14 is held to the carriage 30, being allowed to move (frame 14 is kept under the upward pressure from a spring 103e) only vertically, being guided by the bosses 31, 32, and 41.

With the provision of the above described structural arrangement, even if the carriage 30, which is formed of resinous material for weight and cost reduction, sags at the lengthwise ends, and the sagging causes the bosses 31 and 32 located on the lengthwise (primary scanning direction) ends of the carriage 30 to tilt in the lengthwise direction of the carriage 30, the elongated holes 15 and 16, in which the bosses 31 and 32 fit one for one, afford the bosses 31 and 32 a certain degree of latitude in terms of their movement in the lengthwise direction of the carriage 30; in other words, the elongated holes 15 and 16 allow the bosses 31 and 32 to tilt a certain angle in the lengthwise direction of the carriage 30. Therefore, the bosses 31 and 32 are not damaged by the sagging of the lengthwise end portions of the carriage 30 which occurs due to the warping of the carriage 30.

Further, in this embodiment, the positioning portion 17 for positioning the frame 14 relative to the carriage 30 in terms of the primary scanning direction is prevented from moving in the primary scanning direction (lengthwise direction), by the boss 41 provided on the bearing member 40. Therefore, the number of the positioning related components interposed between the guiding shaft 103c and the frame 14 in this embodiment is smaller than that in the first embodiment, improving the level of accuracy at which the position of the frame 14, in other words, the image sensor unit 108, relative to the carriage 30 in terms of the primary scanning direction (lengthwise direction) is fixed.

Further, the boss 41 is located approximately at the center of the carriage 30 in terms of the lengthwise direction. Therefore, the amount by which the frame 14, in other words, the image sensor unit 108, is displaced in terms of the primary scanning direction (lengthwise direction) by the sagging of the lengthwise end portions of the carriage 30 caused by the vertical warping of the carriage 30, is minimized, which in turn minimizes the decrease in the geometric accuracy at which an image is formed. In other words, the present invention can prevent the vertical warping of the carriage 30 from reducing the level of quality at which an image is formed.

Further, the frame 14 is prevented, by the elongated holes 15 and 16 and the bosses 31 and 32, from moving in the secondary scanning direction, while being afforded some degree of latitude in terms of the movement in the primary scanning direction (lengthwise direction), and is prevented, by the positioning portion 17 and the boss 41, from moving in the primary scanning direction (lengthwise direction), while being afforded some degree of latitude in terms of the movement in the secondary scanning direction. Also, the frame 14 is kept pressed upward upon the glass surface by the spring 103e. Therefore, even if the carriage 30 warps in the vertical direction, the frame 14, in other words, the image sensor unit 108, is not displaced in the primary (lengthwise) or secondary scanning direction. Therefore, the level of quality at which an image is formed does not reduce. In other words, the provision of the above described structural arrangement can provide a higher level of geometric accuracy at which an image is formed; it can prevent the vertical warping of the carriage 30 from reducing the level of quality at which an image is formed.

To sum up, the problems caused by the vertical warping of the carriage 103d or 30 can be prevented by the provision of the following structural arrangement: the frame 14 is provided with two elongated holes for regulating the position of the frame 14 relative to the carriage 103d or 30 in terms of the secondary scanning direction while affording the frame 14 some degree of latitude in its movement in the primary scanning direction, and a positioning portion for regulating the position of the frame 14 relative to the carriage 103d or 30 in terms of the primary scanning direction while affording the frame 14 some degree of latitude in terms of its movement in the secondary scanning direction; and the positioning portion is located between the two elongated hole in terms of the lengthwise direction of the carriage 14.

In the above described embodiments, the structural members of the image sensor were contained in the frame 14. However, the present invention for preventing the problems traceable to the vertical warping of the carriage caused by the temperature fluctuation caused by the heat from a light source is applicable to any image sensor unit, the frame of which comprises: a light source; a linear illuminating means which extends in the primary scanning direction to linearly illuminate an original; and the like.

Also in the above described embodiments, the frame was provided with the holes, and the carriage was provided with bosses. However, the bosses and holes may be provided on the frame and carriage sides, respectively.

While the invention has been described with reference to the structures disclosed herein, it is not confined to the details set forth, and this application is intended to cover such modifications or changes, regarding the measurements, materials, configurations, positional relationship, and the like, of the structural members, as may come within the purposes of the improvements or the scope of the following Claims.

What is claimed is:

1. An image reading apparatus comprising:
   an original plate adapted to support an original;
   a longitudinal reading unit adapted to read an original image, said longitudinal reading unit including, in a frame, a light source, a light receiving unit, and an imaging unit adapted to form an original image on said light receiving unit;
   a supporting member adapted to support said frame of said longitudinal reading unit, said supporting member having a first engaging portion and a second engaging portion to engage with said frame of said longitudinal reading unit;
   a movement unit adapted to move said supporting member relative to said original plate in a direction perpendicular to a longitudinal direction of said longitudinal reading unit;
   a first positioning portion adapted to determine a position of said frame of said longitudinal reading unit relative to said supporting member in the longitudinal direction by engaging with said first engaging portion of said supporting member, said first positioning portion being provided substantially at a central portion of said frame of said longitudinal reading unit; and a second positioning portion adapted to determine a position of said frame of said longitudinal reading unit relative to said supporting member in a moving direction by engaging with said second engaging portion of said supporting member, said second positioning portion engaging with said second engaging portion while being afforded some degree of latitude in the longitudinal direction.

2. An image reading apparatus according to claim 1, wherein a plurality of said second positioning portions are provided, and said first positioning portion is disposed between said second positioning portions.

3. An image reading apparatus according to claim 1, wherein said first positioning portion engages with said second engaging portion while being afforded some degree of latitude in the moving direction.

4. An image reading apparatus according to claim 1, wherein said first positioning portion includes a boss and a claw portion nipping said boss, and said frame of said longitudinal reading unit and said supporting member each has one of said boss and said claw portion.

5. An image forming apparatus according to claim 1, wherein a plurality of said second positioning portions are provided adjacent opposite ends of said longitudinal reading unit.

6. An apparatus according to claim 1, wherein said second positioning portion includes a boss and a hole which is elongated in the longitudinal direction of said longitudinal reading unit, and each of said frame of said longitudinal reading unit and said supporting member has one of said boss and said elongated hole.

7. An image reading apparatus according to claim 1, wherein said longitudinal reading unit includes a light guide member for guiding light from said light source.

8. An apparatus according to claim 1, wherein said image reading apparatus is usable with an image forming apparatus for forming an image on a recording material on the basis of image information read by said image reading apparatus.

* * * * *

UNITED STATES PATENT AND TRADEMARK OFFICE
CERTIFICATE OF CORRECTION

PATENT NO. : 7,088,476 B2
APPLICATION NO. : 10/050851
DATED : August 8, 2006
INVENTOR(S) : Yokota et al.

It is certified that error appears in the above-identified patent and that said Letters Patent is hereby corrected as shown below:

ON THE TITLE PAGE:
At Item (56), References Cited, Foreign Patent Documents, "3-364316" should read --3364316--.

COLUMN 1:
Line 39, "member" should read --member 4,--.

COLUMN 2:
Line 16, "It" should read --If--.
Line 41, "occur" should read --occur when--.
Line 42, "becomes to" should read --becomes--.

COLUMN 3:
Line 4, "elements" should read --members--.

COLUMN 6:
Line 43, "an" should read --a--.
Line 64, "metrical" should read --metrically--.

COLUMN 10:
Line 23, "hole" should read --holes--.

UNITED STATES PATENT AND TRADEMARK OFFICE
CERTIFICATE OF CORRECTION

PATENT NO. : 7,088,476 B2
APPLICATION NO. : 10/050851
DATED : August 8, 2006
INVENTOR(S) : Yokota et al.

It is certified that error appears in the above-identified patent and that said Letters Patent is hereby corrected as shown below:

COLUMN 12:
Line 3, "forming" should read --reading--.
Line 7, "apparatus" should read --image reading apparatus--.
Line 16, "apparatus" should read --image reading apparatus--.

Signed and Sealed this

Third Day of June, 2008

JON W. DUDAS
*Director of the United States Patent and Trademark Office*